United States Patent [19]

Moon et al.

[11] Patent Number: 5,339,207
[45] Date of Patent: Aug. 16, 1994

[54] SERVO SYSTEM FOR PROVIDING INCREASED RECORDING DENSITY AND IMPROVED OPERATION OF THE AGC CIRCUITRY

[75] Inventors: Ronald R. Moon, Los Gatos; Gregg J. Uhlendorf, Morgan Hill; Daniel E. Barnard, San Jose, all of Calif.

[73] Assignee: NEC Corporation, Japan

[21] Appl. No.: 850,326

[22] Filed: Mar. 10, 1992

[51] Int. Cl.⁵ .............................................. G11B 5/596
[52] U.S. Cl. ............................... 360/77.05; 360/77.08
[58] Field of Search ............... 360/77.05, 77.08, 77.11, 360/135

[56] References Cited

U.S. PATENT DOCUMENTS

| | | |
|---|---|---|
| 4,164,763 | 8/1979 | Briccetti et al. . |
| 4,297,737 | 10/1991 | Andresen et al. ............ 360/77.08 X |
| 4,396,960 | 8/1983 | Matla et al. .................. 360/77.08 X |
| 4,424,543 | 1/1984 | Lewis et al. . |
| 4,516,177 | 5/1985 | Moon et al. . |
| 4,669,004 | 5/1987 | Moon et al. . |
| 4,783,705 | 11/1988 | Moon et al. . |
| 5,170,299 | 12/1992 | Moon ............................. 360/77.08 |
| 5,212,604 | 5/1993 | Ogura et al. ................... 360/77.11 |

Primary Examiner—Michael Koczo
Attorney, Agent, or Firm—Skjerven, Morrill, MacPherson, Franklin & Friel

[57] ABSTRACT

A servo system for use in a magnetic recording media is disclosed, with the system utilizing short and long address tracks in a predetermined pattern to increase the usable data storage space on the media. A special pattern is utilized following the A and B BURST patterns for each track on the disk to assist in calibration of the drive. In addition, a special pattern is provided preceding the track address portion of the sectors to identify the associated track address as being a long address, a short address or as the origin sector.

11 Claims, 7 Drawing Sheets

|  | SYNC | T3 | T2 | T1 | T0 |
|---|---|---|---|---|---|
| Gray Address | 100 | T00 T00 0 | T00000 1 | T00T00 1 | T00T00 0 |
| Encoded on Disk | 100 | 000000 | 100100 | 100100 | 000000 |

Signal from head

SERVO SYSTEM FOR PROVIDING INCREASED RECORDING DENSITY AND IMPROVED OPERATION OF THE AGC CIRCUITRY

BACKGROUND OF THE INVENTION

1. Field of the Invention

This invention relates generally to a servo system for a rigid disk drive and more particularly to a servo system utilizing a unique addressing scheme and a special pattern to be utilized before the address and following the burst signals to improve the AGC circuit operation.

2. Description of the Prior Art

In the field of magnetic recording utilized in disk drives where a plurality of tracks are recorded on a rigid magnetic disk, commonly in drives having a small number of disks, embedded servo is utilized to identify the address of the tracks, the sectors within the tracks and for head positioning through a feedback control systems. Typically the tracks are recorded concentrically and within the tracks a plurality of sectors are provided to identify recording areas where user data may be stored. Address information is provided for each track at its origin as well as for each sectors within each track. This track address and sector information is utilized when locating a track where information is to be stored or from where it is to be retrieved, and the address information is also used when moving from track to track under the control of commands from a central processor or host computer.

In the prior art, one approach for providing track address information on a magnetic recording disk is illustrated by U.S. Pat. No. 4,424,543 to Lewis et al. issued Jan. 3, 1984 and entitled "Method and Apparatus for Recording Transducer Positioning Information". In Lewis et al., the tracks on the magnetic recording medium are grouped in two bands of 16 each, with each track within a band being numbered 0-15. Identification of tracks within a band are written on a disk directly in Gray code without being encoded as is typically done in many prior art systems. This provides only the identification of the track within the band, but not the absolute track address, and accordingly other information must be utilized to identify the absolute track address. In Lewis et al. an erase gap precedes the preamble for each sector to identify where the servo information begins. In Lewis et al. an A BURST and a B BURST are utilized for fine track positioning.

A second prior art approach to embedded servo for rigid disk drives is illustrated in U.S. Pat. No. 4,669,004, issued to Moon et al., May 26, 1987 and entitled "High Capacity Disk File with Embedded Sector Servo". A continuation of Moon et al. U.S. Pat. No. 4,669,004 issued as U.S. Pat. No. 4,783,705 on Nov. 8, 1988, entitled "High Capacity Disk File with Embedded Sector Servo and SCSI Interface". In the above identified Moon et al. patents the track address is written in each of the four burst signals located at different radial positions to eliminate the need for phase coherence for each of the tracks on the disk and the track address is written on a 1,7 recording code. Disadvantages of the servo system illustrated in the above two Moon et al. patents when compared to the invention described and claimed herein are that in Moon et al. a phase locked loop is required to read track head and sector information, and since a phase locked loop is being utilized a long burst (8.8 micro seconds) is required to lock-in the phase of the phase locked loop.

SUMMARY OF THE INVENTION

It is an object of the present invention to provide a track address method which provides increased area for recording user data and therefore more efficiently utilizes the recording space available on the disk.

Another object of the present invention to provide a signal recorded on the disk in advance of the sector preamble to preset the gain of the AGC circuitry in the servo system prior to the receipt of the preamble.

A further object of the present invention to provide a pattern which follows the A and B BURST signals in the data recording area to avoid gaps between the A and B BURST signals and the data which will be recorded when user information is placed on the disk.

In accordance with the present invention, each sector of the tracks on the magnetic recording medium has a track address, and for predetermined ones of the sectors, the track address is of a first length and for other sectors within the track the track address is of a shorter length. Additional usable space for recording user data is achieved by using the lesser length track address information in predetermined sectors of the tracks.

In accordance with yet another feature of the present invention, immediately following the A and B BURST patterns, another pattern is written. This additional pattern is utilized to determine the head transducer gain during calibration of the drive.

BRIEF DESCRIPTION OF THE DRAWINGS

Other objects and advantages of the invention will become apparent from a study of the specification and drawings, in which.

DETAILED DESCRIPTION OF THE INVENTION

Figure 1:
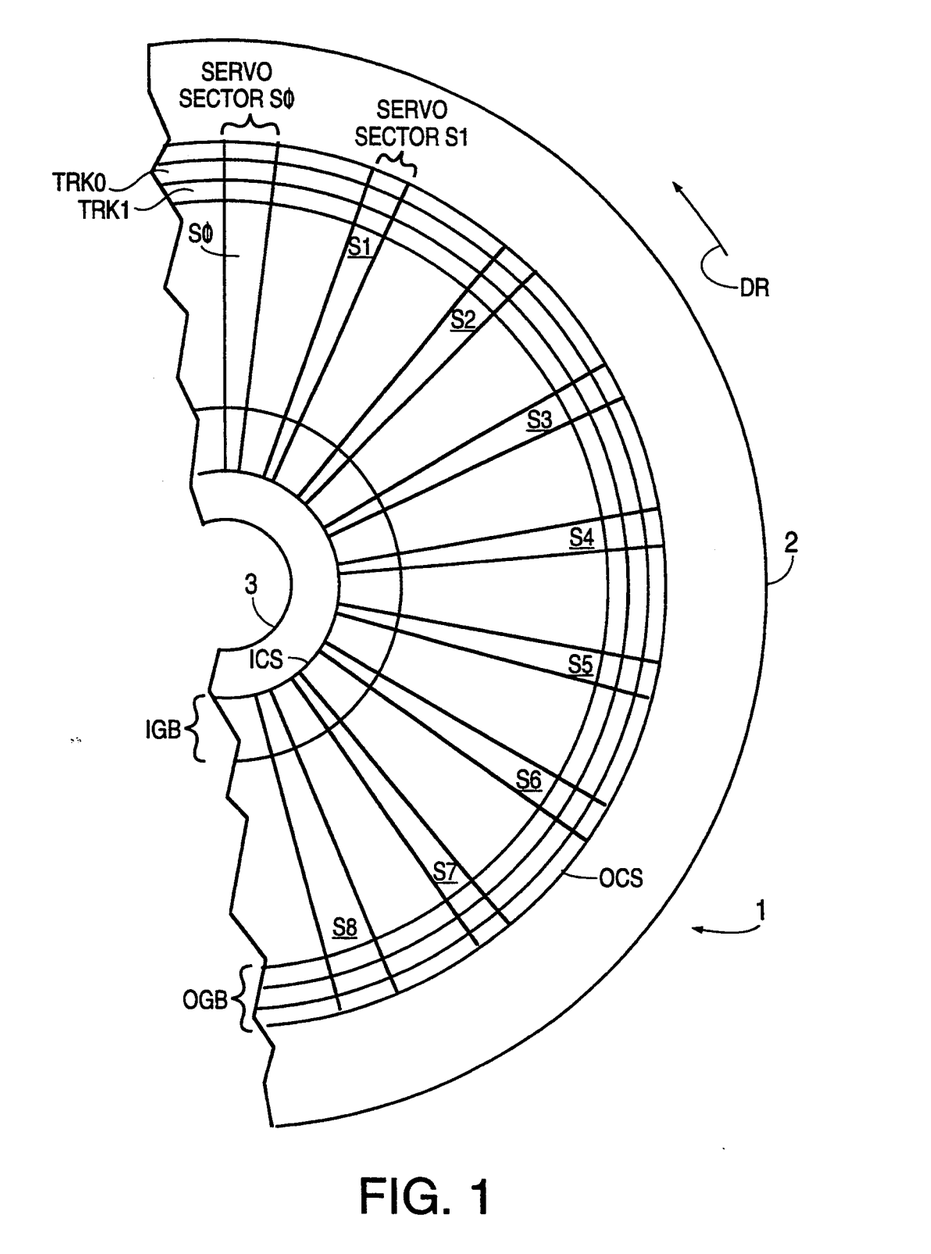
FIG. 1 is a highly enlarged view of a portion of magnetic recording disk indicating graphically the location and relative sizes of sectors on the disk as well as two tracks.
Figure 4:
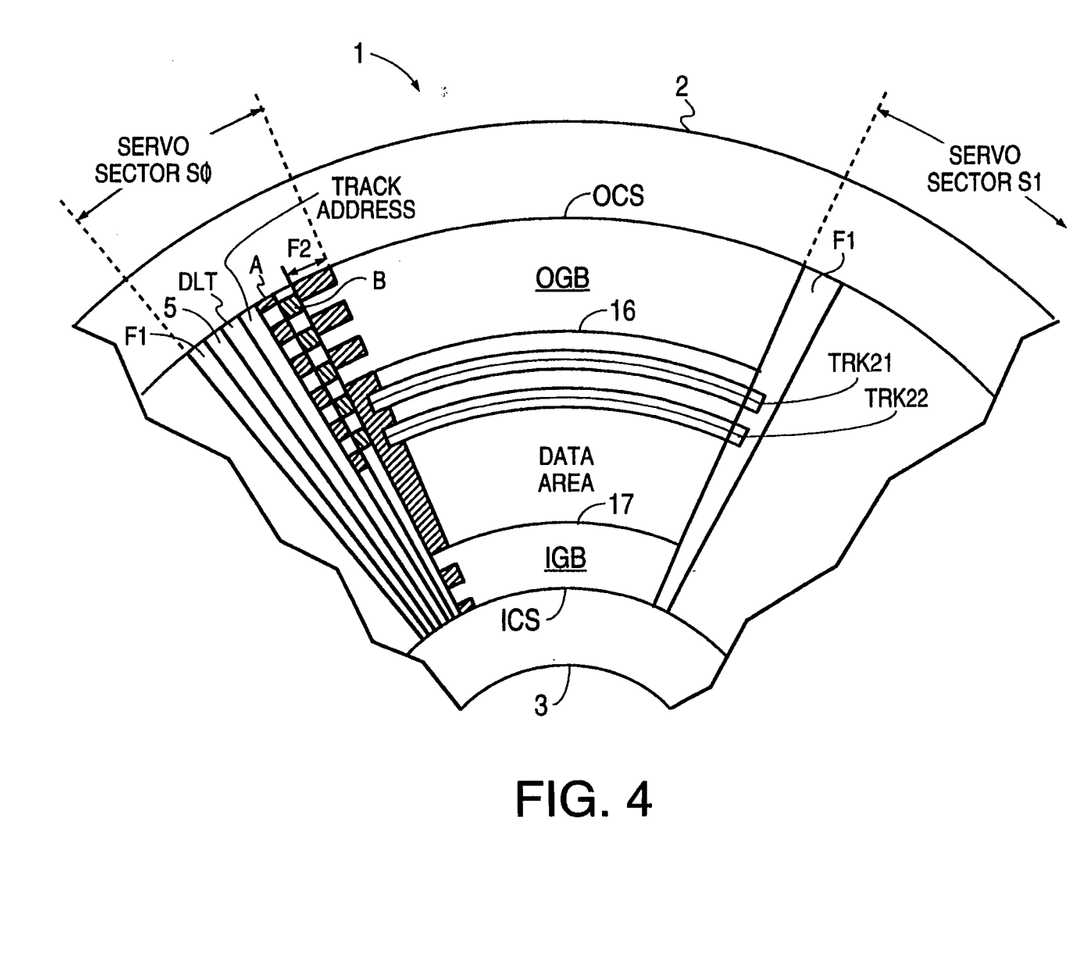
FIG. 4 illustrates in highly enlarged form a portion of magnetic disk 1 in which the portions of servo sector S0 and data portions for sector S0 are illustrated.

The servo system of the present invention utilizes the embedded servo technique and provides a track address at each of the sectors in the tracks of the magnetic media. FIG. 1 illustrates in a highly enlarged fashion (and not to scale) a portion of magnetic disk 1 having a outer peripheral edge 2 and an inner peripheral edge 3. The planar surfaces of magnetic disk 1 are coated with suitable magnetic material to provide for the recording of digital signals on the media. For illustrative purposes, servo sectors S0–S8 are indicated on the disk, as is TRK 0 and TRK 1. The recording surface of magnetic disk 1 is preferably divided into 64 sectors, each of which include a servo sector portion and a data portion. Reference to FIG. 4 will assist in the understanding of the servo sector portion and data portion of a typical sector. Details of the servo sector portion of the sectors will be described subsequently. Servo information is written on the disk through the use of the well known techniques with a phase coherent servo writer. As is known to those skilled in the art, a clock signal is recorded either along the inner or outer periphery of magnetic media 1 to ensure the ability to write servo data in sync radially across the surface of the disk. For the preferred system described herein, this clock signal has a frequency of 16 MHz. The preferable rotational speed of magnetic disk 1 is 5400 rpm. From the forgoing, the time for each sector, both servo information and user data is approximately 174 microseconds. This time is measured from a common point from one sector to a common point of an adjacent sector. Sector S0 is denominated the index sector and identifies a common point across the surface of the disk from which each of the other sectors may be ascertained. In FIG. 1, the arrow indicated by reference character DR is used to indicate the direction of rotation of magnetic disk 1 with respect to a magnetic recording head 8 (FIG. 6) which is suspended above the surface of disk 1.

As briefly noted above, the address portions of the servo sectors on disk 1 have varying lengths and by using intermediate, shorter length address portions between longer track address portions the usable area for recording data on the disk is increased. As illustrated in FIG. 1, servo sectors S0 and S8 occupy longer space on the disk than servo sectors S1–S7 which are interposed between sectors S0 and S8. The preferred ratio of long to short sectors is one long for each seven short sectors, however, as will be appreciated by those skilled in the art, other ratios may be used and the present invention is not limited to this particular ratio of long to short sectors.

Figure 2:
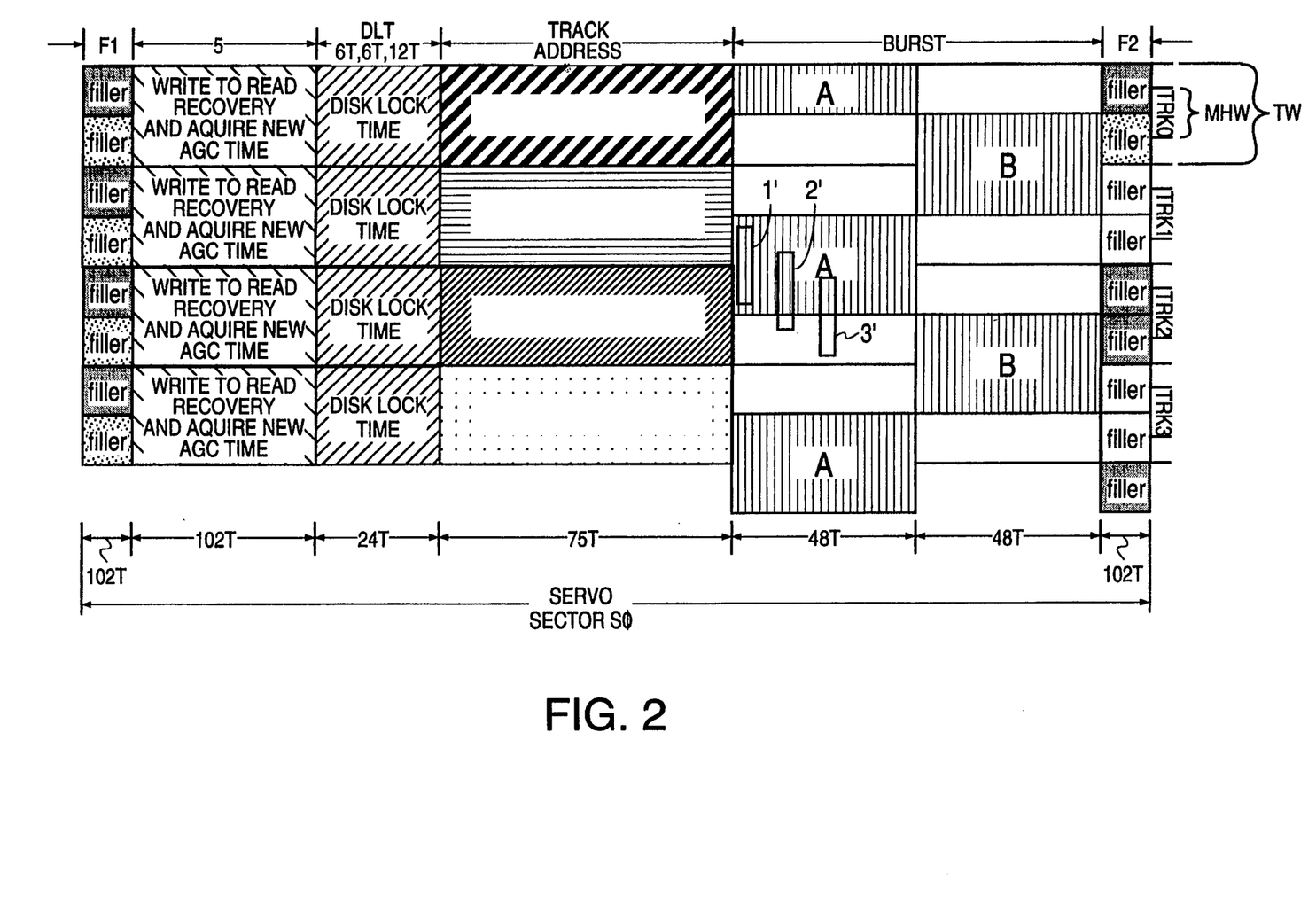
FIG. 2 is a detailed graphic illustration of servo sector S0 of the magnetic recording disk illustrated in FIG. 1.

Turning to FIG. 2, tracks 0–3, indicated by the notations TRK 0, TRK 1, TRK 2 and TRK 3 are illustrated for sector S0. These tracks are a part of the outer guard band, indicated in FIG. 1 by OGB. For time reference purposes, the distance involved and space utilized for various portions of the tracks are indicated using the T designation. The time duration for T is equal to 62.5 nanoseconds, which is computed based upon the use of a clock having a frequency of 16 megahertz. The duration for the portions of the servo field for tracks TRK 0 through TRK 3 are indicated using the T nomenclature as illustrated in FIG. 2. To provide an origin point for the sectors, a disk lock time field, having a duration of 24T, is provided immediately preceding the address portion of the servo field. In FIG. 2, the track address consumes the area between the lines as indicated (75T) and similarly the disk lock time DLT of 24T time duration is also illustrated.

Each of the 64 sectors for all tracks on the disk includes a disk lock time, abbreviated as DLT, which is read and interpreted by suitable circuitry to identify the sector as being an index sector, also referred to as sector 0 and for the other sectors DLT is used to identify whether the following address will be long, which has a length of 75T, or a short address which has a length of 27T. Combinations of 6T and 12T are recorded in the disk lock time space to identify the sector as being the origin sector (sector 0) or index sector, a sector having a long or short address. In a case of the index sector, the pattern written in the disk lock time space is 6T,6T,12T, which in the code written on the disk comprises the combination 100000 100000 100000000000. Since our illustrative portion of disk 1 in FIG. 2 is sector 0, the foregoing disk clock time pattern is recorded in the 24T space immediately preceding the track address. The long track address is 75T in duration and includes 11 bits. The short track address is 4 bits in length. The indication that a short track address is about to be read is provided by a disk lock time code recorded on the disk which comprises 12T,6T,6T.

In the preferred embodiment, for each track on disk 1 there are eight sectors which have a long track address (i.e. 75T) and fifty-six sectors which have a short track address (27T). Table 1 below provides the indication by sector of the disk lock time code and the track address format for the short track address and the long track address utilized on disk 1.

TABLE 1

| Sector Φ (Index Sector) | Long Track Address | | | | |
|---|---|---|---|---|---|
| DLT Code: 6T, 6T, 12T | SYNC 1 | T10 | T9 | T8 | T7 |
| | 1ST NIBBLE - 100 | T00T00 | T00T00 | T00T00 | T00T00 |
| | SYNC 2 | T6 | T5 | T4 | T3 |
| | 2ND NIBBLE - 100 | T00T00 | T00T00 | T00T00 | T00T00 |
| | SYNC 3 | T2 | T1 | T0 | |
| | 3RD NIBBLE - 100 | T00T00 | T00T00 | T00T00 | |
| Sectors 1–7, 9–15, 17–23, 25–31, 33–39, 47–55 and 57–63 | Short Track Address | | | | |
| | SYNC 1 | T3 | T2 | T1 | T0 |
| | 100 | T00T00 | T00T00 | T00T00 | T00T00 |
| Sectors 8, 16, 24, 32, 40, 48 & 56 | Long Track Address | | | | |
| DLT Code: 6T, 12T, 6T | SYNC 1 | T10 | T9 | T8 | T7 |
| | 1ST NIBBLE - 100 | T00T00 | T00T00 | T00T00 | T00T00 |
| | SYNC 2 | T6 | T5 | T4 | T3 |
| | 2ND NIBBLE - 100 | T00T00 | T00T00 | T00T00 | T00T00 |
| | SYNC 3 | T2 | T1 | T0 | |
| | 3RD NIBBLE - 100 | T00T00 | T00T00 | T00T00 | |

The long track address permits the determination with certainty of the track address of up to 2,048 tracks since there are eleven bits in the long track address. The short track addresses utilize the lower four bits of the eleven bit track address. This gives the relative track address within +7 to −8 tracks. Other possible combinations of the ratios between short track addresses and long track address may be utilized and the present invention is not limited to the ratio of 7 short track addresses for each long track address. From the above, it will be appreciated that both the long and the short track address are preceded by a SYNC 1 code, which is recorded on the disk as a 100. The remaining bits of the track address are comprised of, in the case of the short track address bits T3,T2,T1 and T0; and for the long address, bits T0–T10 which is divided into 3 nibbles with a sync patten of 100 preceding each of the nibbles. Table 2 is an example of how a short track address for Gray track 0110 is encoded on the disk.

TABLE 2

| Short Track Address Gray Code Track: 0110 | | | | |
| --- | --- | --- | --- | --- |
| SYNC 1 | T3 | T2 | T1 | T0 |
| 100 | T00T00 | T00T00 | T00T00 | T00T00 |
| SYNC 1 Gray Code | 0 | 1 | 1 | 0 |
| 100 Encoded on Disk | 000000 | 100100 | 100100 | 000000 |

As illustrated above, the short track address begins with a SYNC 1, which is a 100 recorded on the disk. For binary bits 0110, the recording scheme for the transitions encoded on the disk as noted above, is a binary 0 as represented by 000000 and the binary 1 is represented by 100100. These transitions which are recorded on the disk are read by the magnetic head 8 (FIG. 6) in the manner well known to those skilled in the art. This signal is representative of the Gray code track address recorded with the above encoding scheme.

Figure 3:
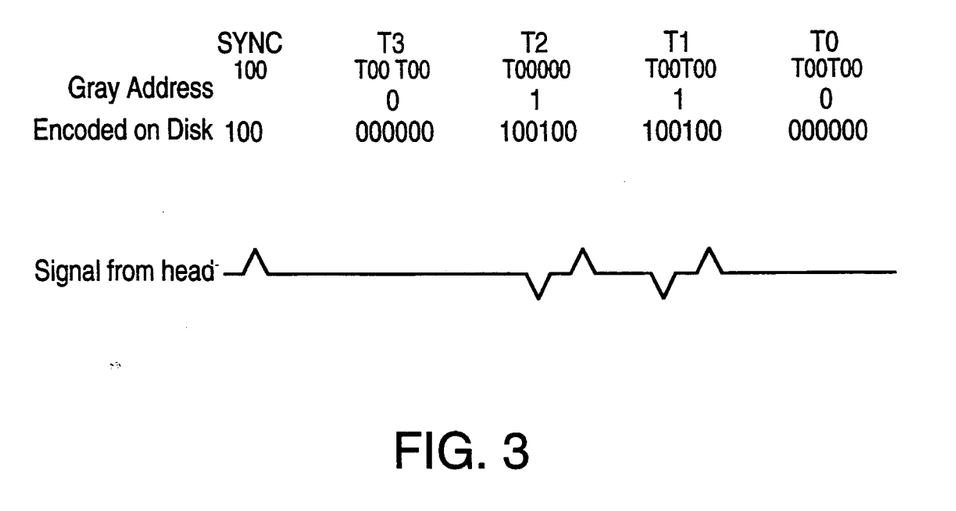
FIG. 3 illustrates the track address of the type in which a 4 bit address is utilized.

For a long track address, the same encoding code is utilized for binary bits T0–T10. The value for the "T" in the bits is determined in the same fashion, that is if the binary 0 is to be encoded on the disk, then a zero is inserted in the T position; and if a binary 1 is to be encoded on the disk, then a 1 is inserted in the T position of the binary bit code area. FIG. 3 illustrates the signal that would be produced by the magnetic recording head 8 passing over the Gray code track address 0110. In FIG. 3, the peaks in the signal produced result from the transition from the encoded data on the disk. The signal produced by the head passing over this area of the disk is one which will be well recognized by those skilled in the art and follows traditional magnetic recording concepts. The foregoing illustrates the encoding scheme for the Gray code track address recorded on the disk with respect to the transitions encoded on the disk. To convert from Gray code to track address, the following formula is applied to the Gray code track address:

$B_{msb} = G_{msb}$ and $B_n = G_n \text{ XOR } B_{n+1}$

Using the above formula, which describes the well known Gray encoding scheme, Gray "6" (0110, converts to a binary "4" 0100).

From the above, it will be understood how the track addresses are written on the magnetic disk 1 for the both short and long track addresses and how the Gray code track address is converted to a binary track number. It will of course also further be appreciated that by interspersing the short track addresses between the longer track address, the net available and usable data area on the disk for user data is increased.

Returning to FIG. 2, preceding the disk lock time (DLT) is the write to read recovery and acquire new AGC time. The pattern written in this portion of the servo track is 3T pattern (100 100 100 . . . ) which is repeated 34 times, thus yielding the 102T time duration indicated in FIG. 2. Immediately preceding the write to read recovery and acquired new AGC time is a filler pattern, indicated by F1, which consists of thirty-four 3T patterns, thus also utilizing 102T time. In FIG. 2, the time duration "T" is not set out proportionally to the space indicated in the diagram, however the time duration indications represent the space utilized on the disk. As will be appreciated by those skilled in the art, there is typically a space between the end of the user data recording area and the beginning of the servo pattern for the subsequent sector. This occurs because the recording of the user data is stopped before reaching the beginning of the succeeding servo sector. Under this situation, the magnetic recording head travels over a portion of the disk on which no signal is recorded. During this blank space the AGC circuitry in the servo channel typically is brought to maximum gain since the circuit is attempting to provide an output signal with a predetermined level from what is basically noise that the magnetic recording head is reading from the disk. Filler pattern F1 is inserted immediately preceding the write to read recovery and acquire new AGC time 5 to allow the AGC circuitry to arrive at a predetermined value so that when the write to read recovery and acquire new AGC time block 5 is encountered, the system will be at a stable and predetermined gain.

A zig-zag burst pattern comprising combinations of A and B BURST is utilized for fine positioning of magnetic head 8 above the tracks on disk 1. In the present invention, the A and B BURST each consist of 3T patterns repeated 16 times, thus yielding a space of 48T for each Of the patterns. In addition to the A and B BURST patterns illustrated in FIG. 2, a filler pattern F2 is written following the B BURST. Filler pattern F2 extends radially the full width of the disk immediately following the B BURST for each sector, with the exception of gaps in the outer guard band (OGB) and inner guard band (IGB). As illustrated in FIG. 4, filler pattern F2 is continuous immediately proceeding the data tracks in the Data Area illustrated for sector S0 as being bounded by lines 16 and 17. As will be appreciated by reference to FIGS. 2 and 4, the filler pattern F2 has one portion which extends above the track centerline and another portion which extends below the track centerline. Additionally, the portions extending above and below the centerline extend lengthwise for the same distance along the track, or in other words the upper and lower portions are coterminous. However, in the inner guard band and outer guard band area, the filler is not provided in the odd tracks in the inner guard band or outer guard band area. The number of tracks dedicated to the inner and outer guard band areas is selected by drive manufacturer. In the preferred version of the drive, the outer guard band area comprises tracks 0 through track 19 and the inner guard band comprises tracks 1130 through 1149. For simplicity in illustration, only a few tracks of the inner and outer guard band areas are illustrated in FIG. 4. In the outer guard band area, as illustrated in detail in FIG. 2, filler pattern F2 is not utilized in tracks 1 and 3, however it is provided in tracks TRK 0 and TRK 2.

In preparation for writing the servo pattern on the disk, a clock pattern is first written at the outer periphery and when writing the servo patterns this clock pattern provides a uniform writing of information cross the radius of the disk to insure that all information is written in sync. As an example in how the servo pattern is written, using TRK 0 as an example, magnetic head 8 which is utilized for reading and writing user data is also used to write the servo patterns. The servo patterns are written one-half track at a time. For example, referring to FIG. 2, the upper pattern for filler F1 is written to a width of one-half the track, and this is followed by writing the other portions of the servo information for each sector for the upper half of TRK 0. The physical track width is indicated in FIG. 2 by the reference character TW. As is typical in disk drive systems, the physical track width TW is greater than the magnetic head width for the track, thus providing a guard band for the user data from track to track. This insures that user data in adjacent tracks do not interfere. In FIG. 2, the magnetic head width is indicated by the reference character MHW, which is illustrated adjacent to track 0 (TRK 0). In writing the servo data for TRK 0, magnetic head 8 writes the upper portion of filler pattern F1, the top portion of the write to read recovery and acquire new AGC time, the top portion of disk lock time, the upper portion of the track address, then the A BURST, then a pattern of zeroes is written during the period when the B BURST will exist immediately below the center of track 0, and then concludes by writing the upper portion of filler track F2. Next, head 8 is positioned precisely one-half track width downwardly and the lower portion of TRK 0 is written, beginning with the lower portion of F1, and continues to write until the end of the track address, the signal to the head is then ceased until the beginning of the B BURST after which the 3T pattern is continued for the width of the B BURST and for the lower portion of filler F2 for TRK 0. The writing of the servo data continues on a track-by-track basis until the complete surface of the disk from the outer crash stop to the inner crash stop area includes servo information for all tracks on the disk. To achieve the blank portion of the filler area F2 for the odd numbered tracks, the filler pattern is written as described above for TRK 0 and on a subsequent pass a DC erase signal is provided in the filler area F2 for track 1 and the odd numbered tracks in the OGB and IGB to remove the filler from those areas. The advantage of removing the filler with respect to odd numbered tracks on inner guard band and outer guard band is that the magnetic head width (MHW) and read channel gain variations can be calibrated out. During calibration, it is important to determine the gain of the magnetic head, and this may be achieved by utilizing filler pattern F2 and the A BURST or filler pattern F2 and the B BURST. As will be described more fully in connection with the description of FIG. 5 and the head positions indicated in FIG. 2. Briefly, the procedure utilized is to peak detect the magnitude of the A BURST signal, then magnitude of the B BURST signal and the magnitude of filler F2. The magnetic recording head is then moved until the peak detected voltage of the A BURST is equal to a peak detected voltage of filler F2 and with this relationship the magnetic head width MHW of magnetic head 8 is determined. After the servo pattern for the entire disk surface is written, the formatting is completed by the final step of writing an AC filler signal in the data area. Utilizing an AC filler in the data area prevents the AGC circuit from going to maximum gain in the data area since before any data is written, without the AC filler, the area for data within each sector would contain no signal.

Figure 5:
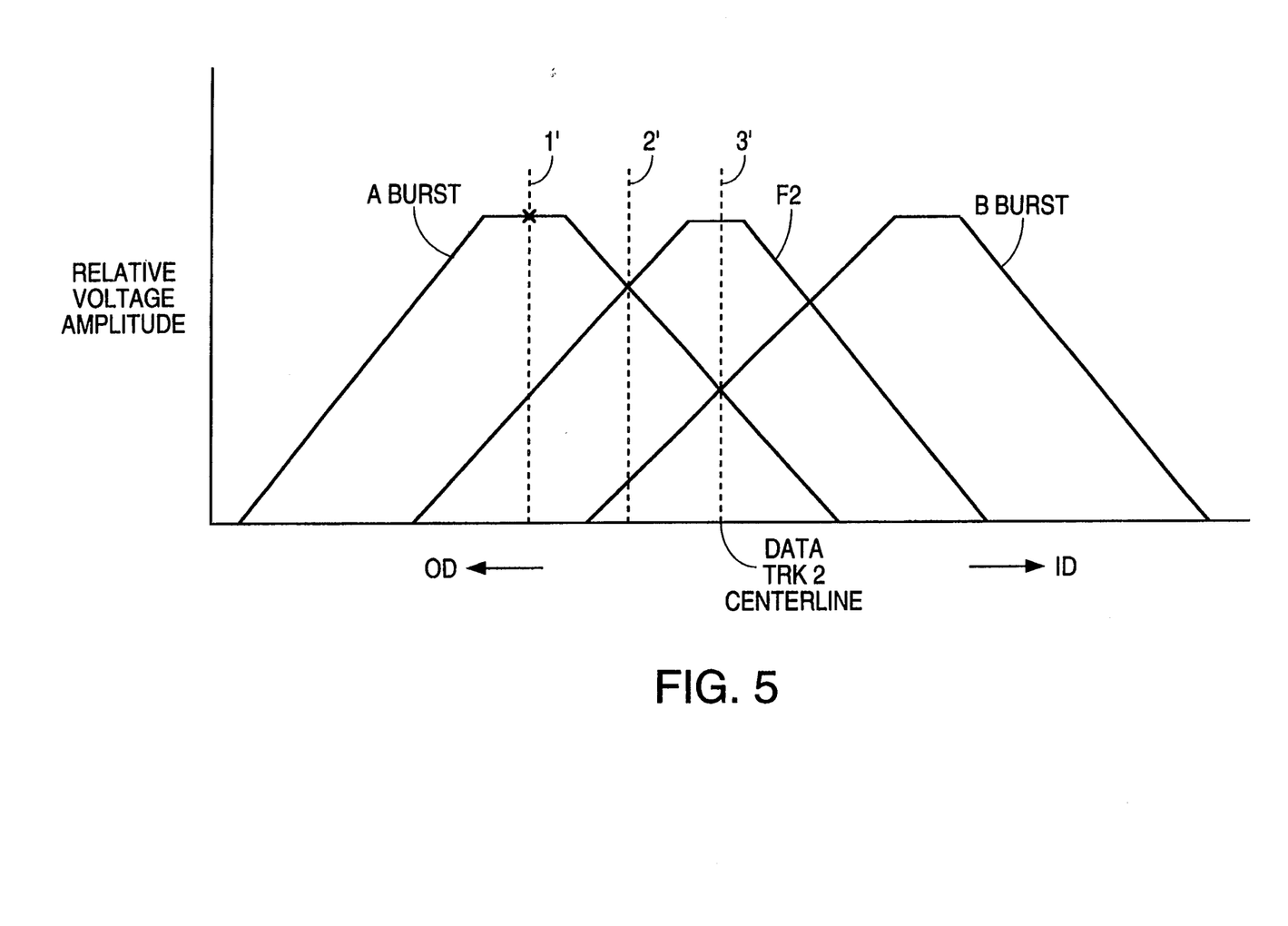
FIG. 5 illustrates the relative voltage amplitude of burst signals and filler signal F2 read by a magnetic head in various positions over a track of the magnetic recording media.

The advantage and the method for utilizing most advantageously filler F2 may be illustrated by referring to FIG. 2 in which magnetic head 8 is pictorially illustrated in a portion of track TRK 2 in the A BURST area in positions 1' 2' and 3'. In position 3' magnetic head 8 is exactly centered on the track. In positions 1' and 2' magnetic head 8 is progressively further off-track, with position 1' being indicated as the most off-track toward the outer periphery of the disk. In FIG. 5 the relative magnitudes of A BURST, filler F2 and B BURST are indicated with respect to the head position varying with respect to TRK 2 centerline toward the OD and the ID of the disk. The curves correspond to the sample and hold voltages which would be obtained as the result of magnetic head 8 being in positions 1' 2' and 3' and positions in between as the head moves more toward the OD or the ID. In position 3' magnetic head 8 is centered over the centerline of TRK 2 and thus the sample and hold voltages read would be a maximum for filler F2 and equal amount for A BURST and B BURST When the head is in position 1' as will be appreciated by reference to FIG. 2, only the A BURST pattern and the filler pattern F2 will be read, resulting in the voltages amplitude indicated by dashed lines in FIG. 5 denoted by reference character 1'. In position 2', the head is more nearly toward the center line of TRK 2, however it is still not completely centered. In this position the voltages read on the A BURST curve, the B BURST curve and the filler F2 are indicated at the crossing point with dashed line 2' in FIG. 5. As illustrated by the crossing points on the voltage curves on FIG. 5, when the magnitude of the voltage for the A BURST and the filler F2 are equal, this indicates that the head in position 2' is 174 track off center. In position 2', only a small portion of the B BURST signal is read. From the above it will be appreciated that by providing filler F2, improved tracking performance may be achieved by the servo system.

Figure 6:
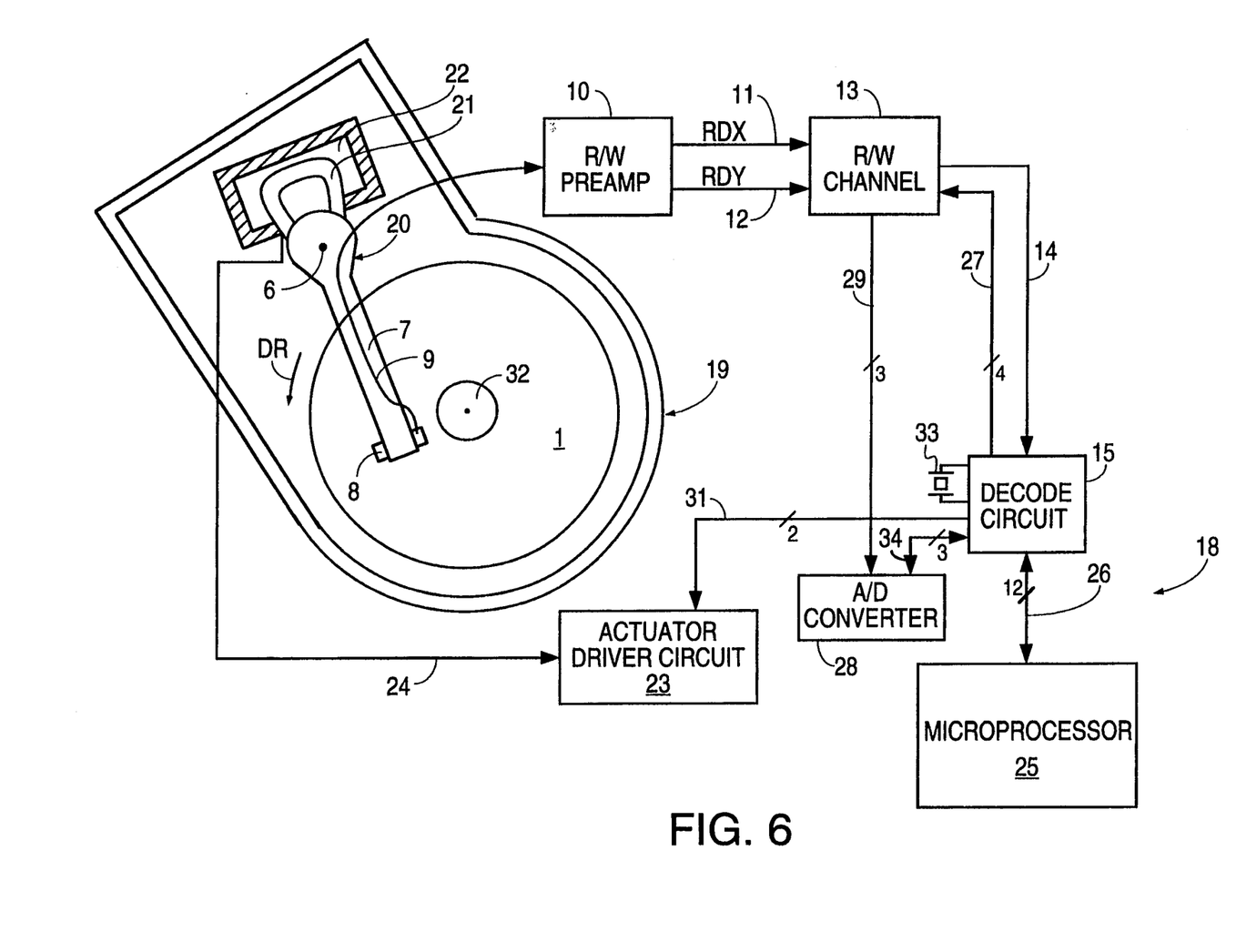
FIG. 6 is a partly block and partly pictorial diagram of a rigid disk drive system utilizing the present invention.

FIG. 6 illustrates rigid disk drive system 18 incorporating the present invention. Magnetic disk 1 having the servo information of the type illustrated above is supported by frame 19 for rotation in the direction indicated by arrow DR by a spindle motor (not shown), the spindle portion of which is indicated by reference character 32. Rotary actuator 20, having a center of rotation 6, and a load beam portion 7, supports magnetic head 8 above the surface of disk 1. Rotary actuator 20 is supported on frame 19 using well known techniques. Rotary actuator 20 also includes actuator coil 21 which is rigidly affixed to the side of rotary actuator 20 which is opposite with respect to center pivot 6 from magnetic head 8. An armature assembly which includes a permanent magnet (not shown) and flux plates 22 provide a flux field across actuator coil 21. Positioning of magnetic head 8 over selected tracks of magnetic disk 1 is achieved by providing suitable drive signals from actuator driver circuit 23 to actuator coil 21 over conductor 24. The signal from magnetic head 8 is provided over cable 9 to read/write preamp 10 which amplifies the relatively weak signal which is picked up by magnetic head 8 from the magnetic recording on disk 1. A suitable amplifier for read/write preamp 10 may be obtained from several sources, one of those being Silicon Systems, Inc. which is located at 14351 Myford Road, Tustin, Calif., 92680. A suitable preamp 10 from SSI is the SSI Part No. 32R2021. The output from read/write preamp 10 is a read X and read Y, indicated in FIG. 6 by RDX and RDY, which is provided over conductors 11 and 12, respectively, to the read/write channel circuit (indicated by R/W CHANNEL 13) which converts the read X and read Y input data to encoded read data which is provided over conductor 14 to decode circuit 15. Read/write channel circuit 13 may be suitably implemented by a National Semiconductor Corporation DP 8492 integrated circuit, which may be obtained from National Semiconductor Corporation, 2900 Semiconductor Drive, Santa Clara, Calif., 95051. Decode circuit 15 converts the encoded read data from disk 1 into binary track address information which is provided to microprocessor 25 over twelve bit bus 26. In FIG. 6 the slash with the twelve adjacent to it indicates that bus 26 is comprised of twelve conductors. Similar notations are utilized for other buses in this figure. Decode circuit 15 also provides SYNC signals over bus 27 to R/W channel circuit 13. These SYNC signals, as is well known by those skilled in the art, direct the signals received over the read/write channel to either the decode circuit (via conductor 14), or to A/D converter circuit 28 (via bus 29). Read/Write channel circuit 13 provides over bus 29 peak detected signals for the A BURST, B BURST and filler F2. The output from A/D converter circuit 28 is provided over bus 34 to decode circuit 15, then over bus 26 to microprocessor 25. Clock and synchronization signals are provided to A/D converter 28 by decode circuit 15 over bus 34. Decode circuit 15 may be implemented in various forms and comprises a digital state machine which takes as its input encoded read data (ERD) which it receives over conductor 14. Decode circuit 15 is shown in block diagram form in FIG. 7, which is described below. Decode circuit 15 synchronizes to the encoded read data and generates timing signals which are provided over bus 27 to read/write channel circuit 13. Crystal 33, which is connected to decode circuit 15, is used in conjunction with a clock generator in decode circuit 15 to generate clock signals. Decode circuit 15 also generates from the ERD binary track address information which is provided to microprocessor 25 via bus 26.

A suitable microprocessor for implementing the present invention is NEC Corporation 78352 microprocessor which may be obtained from NEC Electronics Inc., 401 Ellis Street, P.O. Box 7241, Mountain View, Calif., 94039. Actuator driver circuit 23 may be implemented using a product such as a Hitachi HA 13509 circuit which may be obtained from Hitachi America, Ltd., Semiconductor and IC Division, Hitachi Plaza, 2000 Sierra Point Parkway, Brisbane, Calif., 94005-1819. Control signals to actuator driver circuit 23 are provided over bus 31 from decode circuit 15.

Figure 7:
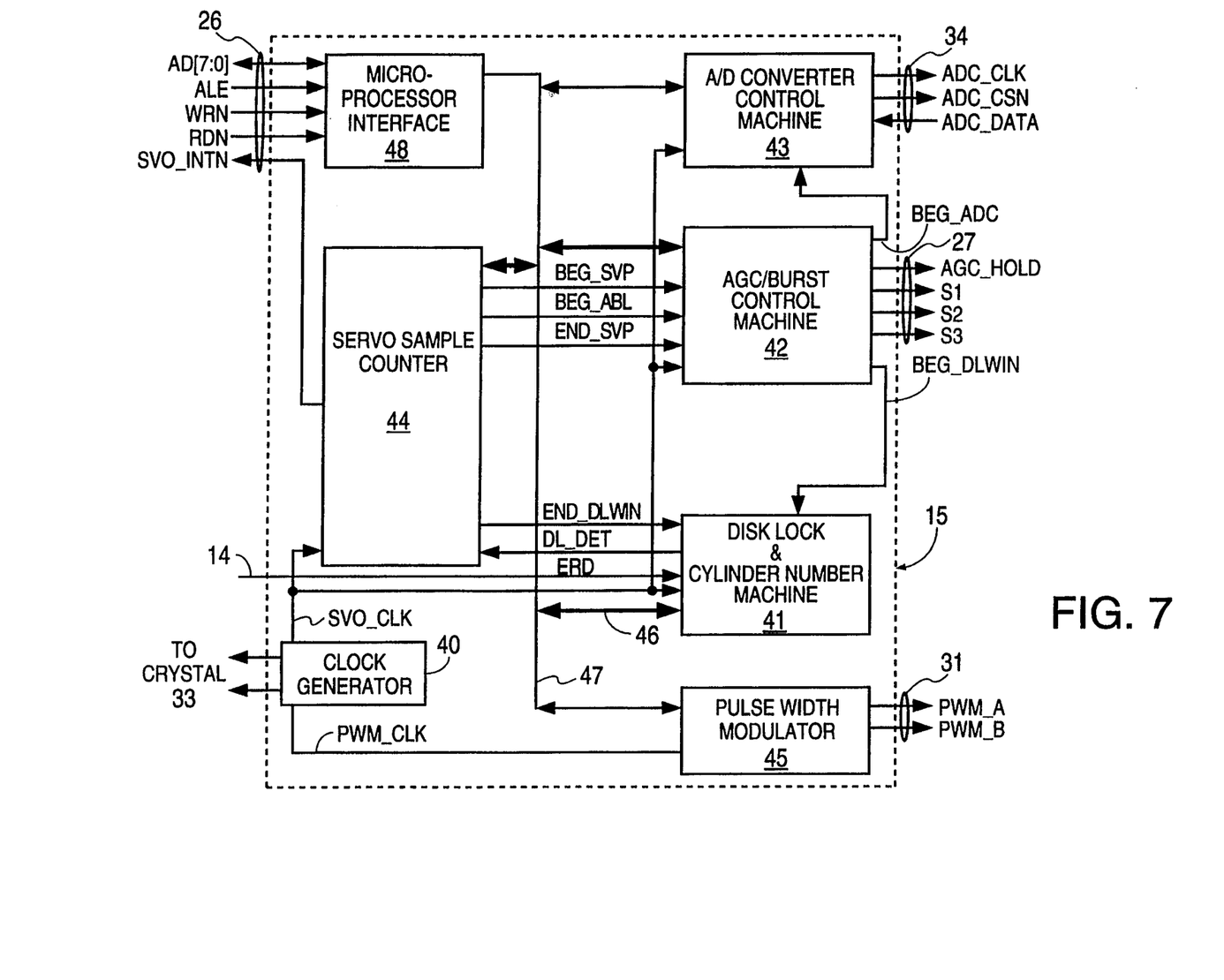
FIG. 7 illustrates in block diagram style a decode circuit for use in practicing the present invention.

A suitable implementation of decode circuit 15 is illustrated in FIG. 7 in block diagram form. Turning to FIG. 7, decode circuit 15 is illustrated within the dashed lines indicated by reference character 15. Clock signals are generated by clock generator 40 which is connected to crystal 33 which has a frequency of approximately 24 MHz. Clock signals denoted SVO CLK provide servo clock signals to disk lock and cylinder number machine 41, AGC/BURST control machine 42, A/D converter control machine 43 and to servo sample counter 44. Clock generator 40 also generates PWM CLK clock signal which is provided to pulse width modulator 45. Encoded read data is provided over conductor 14 to disk lock and cylinder number machine 41 which generates the binary track address based on the encoded read data input. Track address information is provided via bus 46 from disk lock and cylinder number machine to internal bus 47. The track address is then provided to microprocessor 25 via microprocessor interface 48 which is connected to microprocessor 25 via bus 26. The bus indications in FIG. 7 are denoted by the reference character with a circle enclosing the conductors.

The outputs PWM A and PWM B are provide via bus 31 to actuator driver circuit 23 as is illustrated in FIG. 6. A/D converter control machine 43 provides clock, synchronization and data signals to A/D converter 28 over bus 34 to the correspondingly indicated input terminals of A/D converter 28. Sync signals S1, S2 and S3, along with AGCHOLD signals are provided via bus 27 to read/write channel circuit 13. Servo sample counter 44 functions to control timing from sector to sector as circuits 41, 42 and 43 are not active during user data fields.

The above is illustrative of one embodiment of the present invention, however the invention may be practiced by making various modifications to the embodiment described above without departing from the spirit and scope of the invention.

We claim:

1. A track following system for controlling the position of a magnetic head above a track having a centerline on a magnetic recording medium, said track having a first edge on a first side of said centerline and a second edge on a second side of said centerline, said system comprising:

a magnetic recording medium having a first burst pattern of a predetermined length and extending from said centerline toward said first edge of said track, a second burst pattern of a predetermined length, said second burst pattern extending from said centerline toward said second edge of said track;

a magnetic head supported on a movable actuator arm for positioning said magnetic head above said track in operative relationship with said track for detecting said patterns and producing an output signal for each of said patterns, the amplitude of the output signal being representative of the position of said head with respect to said track centerline;

actuator drive means connected to said actuator arm, said actuator drive means producing a force in response to receipt of a drive signal to move said actuator arm;

circuit means coupled to said magnetic head for receiving said output signals from said magnetic head, comparing the value of said signals to predetermined values and producing an output drive signal; and means coupling said output from said circuit means to said actuator drive means to move said head to a position above the centerline of said track, wherein said track is divided into a plurality of sectors, each of said sectors including said first and second burst patterns, and each of said sectors including an address portion for identifying the track, and further wherein predetermined ones of said address portions are of a first length and others of said address portions are of a second length.

2. A system according to claim 1, wherein a disk lock time code is included on said track preceding each address, and the pattern of said disk lock time code identifies its associated address as being of either said first length or of said second length.

3. A system according to claim 2, wherein said track includes an index sector, and wherein the disk lock time code for said index sector is different than the disk lock time code for said track addresses of said first length and said track addresses of said second length.

4. A system according to claim 3, wherein said track addresses of said first length are eleven bits in length and said track addresses of said second length are four bits in length.

5. A system according to claim 3, wherein the disk lock time code for said index sector is comprised of the pattern 6T, 6T, 12T; the disk lock time code for track addresses of said first length, other than the track address associated with said index sector, is 6T, 12T, 6T; and the disk lock time code for track addresses of said second length is 12T, 6T, 6T wherein the 6T portion of the pattern is represented by the bit pattern 100000 recorded on the magnetic recording media and wherein the 12T portion of the pattern is represented by the bit pattern 100000000000 recorded on the magnetic recording medium.

6. A system according to claim 1, wherein said track addresses of said first length are eleven bits in length and said track addresses of said second length are four bits in length.

7. A system according to claim 6, wherein the ratio of the number of track addresses having eleven bits to the number of track addresses having four bits is one to seven.

8. A system according to claim 1, wherein within said track the ratio of the number of track addresses having said first length to the number of track addresses having said second length is one to seven.

9. A system according to claim 1, wherein the track address bits are encoded on said magnetic medium with the recording code in which a track address bit "0" is recorded as the pattern 000000, and a track address bit "1" is recorded as the pattern 100100.

10. A track following system for controlling the position of a magnetic head above a track having a centerline on a magnetic recording medium, said system comprising:

a magnetic recording medium including a plurality of tracks defining a data area, said tracks having even and odd number identification, each of said tracks having a first burst pattern, followed by a second burst pattern which is followed by third pattern, each of said tracks in said data area having a centerline and a first edge on a first side of said centerline and a second edge on a second side of said centerline, wherein in each even (odd) numbered track in said data area said first burst pattern extends from said centerline toward said first edge of the track, and said second burst pattern extends from said centerline toward said second edge of said even (odd) numbered track, and wherein in each odd (even) numbered track in said data area said first burst pattern extends from said centerline toward said second edge of said odd (even) track and said second burst pattern extends from said centerline toward said first edge of said odd (even) numbered track, and wherein said third pattern has a first portion which extends from said centerline toward said first edge and a second portion which extends from said centerline toward said second edge, and further wherein said first portion and said second portion are coterminous;

a magnetic head supported on a movable actuator arm for positioning said magnetic head above said track in operative relationship with said track for detecting said patterns and producing an output signal for each of said patterns, the amplitude of the output signal being representative of the position of said head with respect to said track centerline;

actuator drive means connected to said actuator arm, said actuator drive means producing a force in response to receipt of a drive signal to move said actuator arm;

circuit means coupled to said magnetic head for receiving said output signals from said magnetic head, comparing the value of said signals to predetermined values and producing an output drive signal; and means coupling said output from said circuit means to said actuator drive means to move said head to a position above the centerline of said track.

11. A system according to claim 10, wherein said magnetic recording medium includes a first area outside of said data area, wherein said first area includes a plurality of tracks each having a first burst pattern followed by a second burst pattern, and further wherein said first area includes three consecutive tracks, one of which includes a third pattern and neither the immediately adjacent track toward an inner edge of said disk nor the immediately adjacent track toward an outer edge of said disk include a third pattern.

* * * * *